3,357,942
FIRE-RETARDANT POLYCARBONATES
Winston J. Jackson, Jr., and John R. Caldwell, Kingsport, Tenn., assignors to Eastman Kodak Company, Rochester, N.Y., a corporation of New Jersey
No Drawing. Filed Apr. 5, 1965, Ser. No. 445,721
10 Claims. (Cl. 260—45.7)

ABSTRACT OF THE DISCLOSURE

Polycarbonates having an inherent viscosity of at least 0.4, the recurring structural unit of said polycarbonate containing the residue of at least one aromatic dihydroxy compound, are rendered fire-retardant by adding thereto decachlorooctahydro - 1,3,4 - metheno-2H-cyclobuta(cd)-pentalen-2-one.

---

This invention relates to novel fire-retardant polycarbonates, and more particularly it relates to fire-retardant polycarbonates which do not suffer a substantial loss in tensile properties or heat-distortion temperature by reason of the presence of the additive producing the fire-retardant property.

Polycarbonates, like many other materials which are composed of carbon, hydrogen, and oxygen, are flammable and, accordingly, it is desirable in many applications of these materials to add a material which will cause the composition to be fire-retardant. In general, additives which produce the effect of fire-retardancy are chlorinated materials. However, when such materials are added in sufficiently high concentrations to produce the desired level of fire-retardancy, undesirable side effects are frequently produced at the same time. These side effects usually relate to the lowering of strength properties, such as tensile strength and tensile modulus, and the lowering of the heat-distortion temperature.

It is an object of this invention to provide polycarbonate compositions which have fire-retardant properties. It is another object of this invention to provide polycarbonate compositions which are fire-retardant, and which do not suffer any substantial loss in tensile properties or heat-distortion temperature by reason of the presence of the fire-retardant additive.

It is another object of this invention to provide shaped articles, such as films or fibers, of polycarbonates which have fire-retardant properties and which do not suffer any substantial loss in tensile properties or in the heat-distortion temperature by reason of the presence of such fire-retardant additives. Other objects will become apparent from the more detailed description of this invention which follows.

The foregoing objects are accomplished in accordance with the practice of this invention by providing a composition comprising a polycarbonate having an inherent viscosity of at least about 0.4 and containing a residue of at least 1 aromatic dihydroxy compound and decachlorooctahydro-1,3,4-metheno - 2H - cyclobuta(cd)pentalen-2-one, having the structural formula

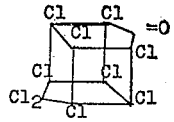

This material will be referred to herein as decachloroketone. Fire-retardant properties are greatly enchanced when the concentration of decachloroketone is in the range of about 10% to about 40% by weight of the composition. In the preferred embodiment of this invention, 20 to 30% by weight of decachloroketone is sufficient to supply self-extinguishing properties to films and fibers made of polycarbonates, while even less of the decachloroketone is sufficient to supply such properties to thicker objects, such as those prepared by injection molding techniques. Although the optimum in fire-retardant properties is not reached until the concentration of decachloroketone exceeds about 10% by weight of the composition, there are advantages to be gained in certain embodiments of this invention when the concentration of decachloroketone is less than 10%. Strength properties and heat-distortion temperature, as well as fire-retardancy change by degree as small amounts of decachloroketone are added to the polycarbonate base material. Thus, amounts as low as about 0.5% by weight of decachloroketone are useful, and as higher and higher concentrations are employed, the effect is more pronounced.

It is surprising that a material of this size and concentration does not have any adverse effect on the tensile properties and the heat-distortion temperature of the composition. A product which is similar to decachloroketone in that the oxygen of the ketone group is replaced by two chlorine atoms (sold under the tradename "Dechlorane") is not sufficiently compatible with polycarbonates to be incorporated in such materials in the appropriate concentrations to produce fire-retardancy, and furthermore, its presence causes a material loss in the tensile properties of the resulting composition.

The invention is applicable to all polycarbonates which have inherent viscosities of above 0.4 and which contain the residue of at least one aromatic dihydroxy compound. Examples of such polycarbonates are those containing the residues of 4,4'-isopropylidenediphenol (also known as bisphenol A), 4,4'-ethylidenediphenol, 4,4' - (1-methylpropylidene) diphenol, 4,4'-methylenediphenol, 4,4'-sulfonyldiphenol, 4,4'-oxydiphenol, 4,4' - (1,2-ethylene)diphenol, 4,4' - cyclohexylmethylenediphenol, 4,4'-cyclohexylidenediphenol, 4,4' - (2 - norbornylidene)diphenol, 4,4'-dihydroxybiphenyl, 4,4' - (hexahydro - 4,7 - methanoindan-5-ylidene)diphenol, hydroquinone, 2,5-dichlorohydroquinone, 1,4-naphthalenediol, and 5,6,7,8-tetrahydro-1, 4-naphthalenediol. Other representative polycarbonates to which the present invention is applicable are listed in U.S. Patents 3,005,236 and 3,030,335, and in copending application, Ser. No. 292,139 filed July 1, 1963, entitled "Bisphenol Polycarbonates and Polyesters," now U.S. Patent 3,317,466, patented May 2, 1967. The preferred polycarbonates for this invention are those containing only the residues of not more than two aromatic diols attached to carbonyl groups, resulting in the recurring structural units

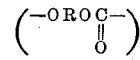

In addition to containing the residue of at least one aromatic dihydroxy compound, these polycarbonates also may contain the modifying residue —O—R—O— of one or more diols wherein R may be alkyl, alicyclic, aryl or a combination thereof, or one or more alkyl, alicyclic, or aromatic dicarboxylic acids. The diols may be employed as such in the main condensation reaction or first converted to a bischloroformate. Such alkyl diols may be straight or branched and may contain from 2 to 20 carbon atoms. Representative ones include ethylene glycol, 2,2-dimethyl - 1,3 - propanediol, and 1,10-decanediol. Diols containing cyclic groups include 1,4-cyclohexanediol, 1,4-cyclohexanedimethanol, 2,5-norbornanediol, and p-xylene-alpha, alpha'-diol. Other diols are given below in the description of bischloroformate reactants.

The polycarbonates from bisphenols may be prepared by adding phosgene and/or a bischloroformate of a diol, to a cooled, stirred aqueous mixture containing sodium hydroxide, the bisphenol, any modifying diols, a catalyst, and methylene chloride.

A bisphenol (residue shown by —O—B—O) and phosgene give recurring structural units in the polymer of:

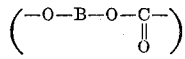

A bisphenol and a bischloroformate of a diol residue shown by

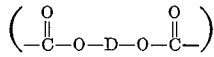

give recurring structural units of:

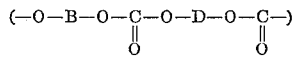

The diol from which the bischloroformate is prepared may be aromatic, aliphatic, or alicyclic, and may be primary, secondary, or tertiary. The carbon chain of aliphatic diols may be straight, or branched, and may contain from 2 to 20 carbon atoms. Examples of diols are ethylene glycol; 1,6-hexanediol; 1,4-hexanediol; 1,4-cyclohexanedimethanol; p-xylylenediol; 2,5 - norbornanediol; trans-1,4-cyclohexanediol; 2,5-dimethyl - 2,5 - hexanediol; hydroquinone; and 4,4-isopropylidenediphenol. Also any of the following groups may be present in the molecule (R=alkyl or aryl): —$R_2C$—, —O—, —$OCH_2CH_2O$—, —S—, —SO—, —$SO_2$—, —$SO_2NR$—, —NR—,

—CONH—

—CO, —COO—, —$CF_2$, —NRNR—, —CH=CH—, —C≡C—, phenylene, cyclohexylene, etc.

Bischloroformates of aliphatic and alicyclic diols may be prepared by adding an excess of phosgene to the diol suspended in ethylene dichloride. If the diol reacts very slowly, some dry dioxane is also added to increase its solubility in the medium. After all of the diol has been dissolved, dry air is passed in until all of the hydrogen chloride and excess phosgene has been swept out. The bischloroformate solution may then be used as needed in the polymerization reactions.

Bischloroformates of aromatic diols, including bisphenols, may be prepared by simultaneously adding the diol (dissolved in dioxane) and dimethylaniline to a stirred solution of phosgene in toluene. A similar procedure is described in British Patent 613,280.

When a bischloroformate is added to the reaction mixture, the molar amount of the bisphenol preferably should be equal or in slight excess (5 mole percent). When phosgene and a bischloroformate are both added, or the phosgene alone is used, the phosgene preferably should be 5 to 10 mole percent in excess of its equivalent bisphenol in the reaction mixture. A quaternary ammonium salt or hydroxide increases the rate of polymerization. This may also be accomplished with certain tertiary amines, such as tri-n-butyl amine, which is preferred. The optimum temperature range is 15 to 25° C. At lower temperatures a longer reaction time is required. At higher temperatures hydrolysis tends to lower the inherent viscosity of the polymer product. Depending upon the catalyst used, the normal reaction time required to obtain a maximum molecular weight product may vary from 10 minutes to 2 hours. The reaction rate is slower if impure reactants or if no catalyst is used. Longer reaction times permit polymer hydrolysis which tends to lower its molecular weight. At the end of the reaction time the alkali present must be neutralized with acetic, hydrochloric, or other acid.

After the reaction is completed, the polymer layer is diluted by adding methylene chloride and then is washed thoroughly with water. The polymer can be precipitated by slowly pouring the methylene chloride phase into methanol, hexane, or other non-solvent.

In addition to the interfacial process just described for preparing the polycarbonates of this invention, these polymers may also be prepared by adding phosgene and/or a diol bischloroformate to a stirred mixture containing the bisphenol and a tertiary amine, such as pyridine or triethylamine. A portion of the tertiary amine may be replaced with a solvent for the polymers, such as methylene chloride. In contrast to the interfacial process, in this process it is not necessary to add nonaromatic diols in the form of their bischloroformates—the diols themselves may be added. Copolycarbonates are then obtained when phosgene is added to the bisphenol/diol mixture in the tertiary amine.

These polycarbonates also may be prepared by the ester interchange process, that is, by heating the bisphenol, a diaryl carbonate, and a suitable catalyst under reduced pressure. Satisfactory diaryl carbonates include diphenyl carbonate, ditolyl carbonate, dixylyl carbonate, and dinitrophenyl carbonate. Catalysts include the oxides, hydrides, and hydroxides of alkali metals and alkaline earth metals and also the free alkali and alkaline earth metals. Other suitable catalysts include butyl lithium, phenyl lithium, zinc oxide, lead oxide, dibutyltin oxide, and sodium aluminate. The usual method is followed of heating the reactants under reduced pressure to remove the phenolic compound as the condensation proceeds. Required temperatures are 250–350° C. It is preferred to build up final molecular weight by the solid-phase process in which the granulated polymer is heated under reduced pressure (preferably below 1 mm. of mercury) at a temperature somewhat below its melting point.

The polycarbonates of this invention also include copolycarbonates prepared, for example, by condensing more than one bisphenol with either phosgene, a diol bischloroformate or a diaryl carbonate, or by condensing a mixture of a bisphenol and two or more diol bischloroformates. Block copolycarbonates are prepared by condensing a mixture of low-molecular-weight homopolycarbonates with phosgene. Mixed copolymers are prepared by condensing a bisphenol with a bischloroformate of a polymeric diol (e.g., polyethylene oxide bischloroformate). Further explanation of various polycarbonate preparations is contained in copending U.S. application, Ser. No. 292,139, filed July 1, 1963, now U.S. Patent 3,317,466, patented May 2, 1967.

Decachloroketone may be prepared from hexachlorocyclopentadiene and liquid sulfur trioxide as described in U.S. Reissue Patent 24,435. The structure of the resulting ketone is shown in Journal of Organic Chemistry, vol. 25, 1225 (1960). The monohydrate of decachloroketone may be purchased commercially and the water of hydration may be easily removed azeotropically by refluxing a toluene solution of decachloroketone and collecting the water in a Dean-Stark trap. The anhydrous decachloroketone may then be recovered by evaporation of the toluene.

Films and fibers of the composition of this invention may be obtained by well known methods. One procedure is to dissolve the polycarbonate and the decachloroketone in a solvent such as methylene chloride and casting the film by conventional techniques. Such a solution may also be used for the spinning of fibers by the techniques of dry-spinning. Normal extrusion techniques may also be employed to extrude various shaped articles, including films and fibers. The films and fibers obtained from the foregoing techniques may be oriented by drafting or stretching to enhance their physical properties.

In order to prepare the compositions of this invention for subsequent extrusion or molding operations, it is preferable to dry-blend particles of the polymer of about 10 to 20 mesh or smaller and powdered decachloroketone. These materials are thoroughly mixed and dried overnight in a vacuum oven at 100° C. to remove all traces of moisture. This material is then suitable for compression molding, injection molding, or extrusion. If it is desired to increase the thermal stability of this mixture prior to the molding operation, the composition of polycarbonate and decachloroketone may be modified by the addition of 0.1% to 4% of one or more of the following types of chemical compounds: organotin compounds, especially organotin sulfur, epoxy compounds, aziridinyl compounds, urea phosphite, unsaturated aliphatic fatty acid salts (e.g., cadmium salts, zinc salts, or tin salts), or powdered calcium carbonate.

It has been found that in comparison to other classes of additives, decachloroketone has a relatively small effect on the tensile properties and the heat-distortion temperature of the polycarbonate compositions. When such compositions are compared to those containing plasticizers, it is found that the latter compositions exhibit a greatly decreased tensile modulus, tensile strength, and heat-distortion temperature, and an increased elongation and toughness. When the compositions of this invention are compared with those containing stiffening agents, it is found that the latter compositions exhibit a greatly decreased elongation, heat-distortion temperature, and toughness, and an increased tensile modulus and tensile strength. The compositions of this invention, on the other hand, exhibit considerably less depression of the heat-distortion temperature than do the compositions containing plasticizers or stiffening agents; and, at the same time, exhibit relatively small change in the tensile modulus and in the tensile strength. In copending patent application Serial No. 137,979, filed September 14, 1961, now U.S. Patent 3,254,047, patented May 31, 1966, there are disclosed compositions of polycarbonates and stiffening agents, and the effect of these materials on certain tensile properties.

While the preferred thermoplastic material for use in this invention is a polycarbonate, it is to be understood that decachloroketone will provide fire-retardant properties for other thermoplastic materials if the polymer and the additive are compatible with each other to the extent that sufficient additive can be introduced to produce the effect of fire-retardancy. Polyesters, particularly those prepared from aromatic dihydroxy compounds, can be treated with decachloroketone to enhance their fire-retardant properties. In certain embodiments other suitable thermoplastic materials, such as polyolefins, polyvinyls, polyacetals, and the like, may be provided with an enhanced fire-retardancy by modification with decachloroketone.

In the illustrative examples which follow, there is a comparison of compositions containing polycarbonates and the decachloroketone of this invention, and comparisons with similar compositions containing plasticizers and stiffening agents. These examples are not intended to limit or restrict the invention in any manner whatsoever, but rather are intended to show the broad scope of this invention.

*Example 1*

In a series of comparative experiments, films were made with and without the inclusion of decachloroketone and other additives, and the films were tested for fire retardancy, for tensile properties, and for heat-distortion temperature. In each instance a polymer dope was prepared by dissolving the polycarbonate and decachloroketone in methylene chloride. The dopes were coated with a doctor blade onto 9 in. x 18 in. glass plates, and the methylene chloride was allowed to evaporate into the air at room temperature. The films, 1 to 2 mils in thickness were removed and heated in an oven at 100° C. for 2 to 3 hours to insure the removal of all solvent. Tensile properties (tensile strength, modulus, and elongation) were measured in accordance with ASTM D882–61T Method A. The heat-distortion temperatures (2% deflection at a load of 50 p.s.i.) were measured as described in ASTM D1637–61 and Modern Plastics, 34 (No. 3), 169 (1956).

Polycarbonates were prepared from the following ingredients and the resulting products were tested to determine their inherent viscosities.

| | Ingredients | Inherent Viscosity |
|---|---|---|
| Polycarbonate: | | |
| A | 4,4'-isopropylidenediphenol and phosgene. | 1.01 |
| B | 4,4'-(2-norbornylidene)diphenol and phosgene. | 1.64 |
| C | 4,4'-(cyclohexylmethylene)-diphenol and phosgene. | 1.23 |
| D | Equimolar amounts of 4,4'-(hexahydro-4,7-methanoindan-5-ylidene)diphenol and of 4,4'-isopropylidenediphenol plus phosgene. | 0.63 |
| E | Hydroquinone and 1,4-cyclohexane-diol bischloroformate. | 0.86 |

In Table I there is a listing of the concentration of additive employed and the test results exhibited by films prepared from the compositions. In two instances additives other han decachloroketone were employed; namely, dibenzyl succinate and a chlorinated biphenyl. The former is a known plasticizer for polycarbonates while the latter is a stiffening agent for polycarbonates. These additives were tested to provide a comparison between the physical properties of compositions containing these additives and compositions containing decachloroketone. Films 2 mils in thickness and containing 20–30% by weight of the decachloroketone were self-extinguishing according to ASTM D568–61. Less decachloroketone was required to make molded objects and thicker films self-extinguishing.

TABLE I

| | Decachloro-ketone Wt., Percent | Modulus, 10⁻⁵ P.s.i. | Tensile Strength, P.s.i. | | Percent Elongation at Break | Heat Distrotion, Temp., ° C. |
|---|---|---|---|---|---|---|
| | | | At Yield | At Break | | |
| Polycarbonate: | | | | | | |
| A | 0 | 3.2 | 8,500 | 9,200 | 50 | 154 |
| A | 20 | 3.1 | 10,200 | 9,000 | 40 | 146 |
| A | 30 | 2.9 | 8,400 | 8,000 | 17 | 143 |
| A | ¹ 30 | 1.4 | 2,100 | 3,100 | 114 | <40 |
| A | ² 30 | 4.7 | -------- | 12,700 | 4 | 77 |
| B | 0 | 3.4 | 9,800 | 10,700 | 40 | 230 |
| B | 20 | 3.4 | 10,500 | 10,200 | 21 | 200 |
| B | 30 | 3.4 | 10,700 | 10,000 | 8 | 188 |
| B | 40 | 3.1 | -------- | 10,200 | 5 | 174 |
| C | 0 | 2.8 | 9,800 | 10,200 | 30 | 198 |
| C | 25 | 2.7 | 10,200 | 10,200 | 20 | 180 |
| D | 0 | 3.4 | 11,400 | 10,700 | 43 | 201 |
| D | 30 | 3.3 | 10,800 | 10,100 | 12 | 170 |
| E | 0 | 3.6 | 10,200 | 10,100 | 8 | 130 |
| E | 25 | 3.6 | 9,900 | 10,000 | 6 | 125 |

¹ Dibenzyl succinate.
² Biphenyl containing 54% chlorine.

Example 2

A polycarbonate was prepared in a similar manner and from the same ingredients as those indicated in Example 1 for Polycarbonate A. In this instance the polycarbonate was prepared with an inherent viscosity of 0.62. This polycarbonate was employed to prepare injection-molded test bars, which were then tested for fire-retardancy and various strength properties. The properties reported in Table II were determined according to standard ASTM procedures (D1708–59T, D747–61T, and D785–51 Method A). The heat-distortion temperature was measured on flexure bars (2-in. span) at 264 p.s.i. (0.2% deflection) in a forced conversion oven as described in Modern Plastics, 34 (No. 3), 169 (1956).

When flexure bars (1/8-in. thick) containing 20% decachloroketone were held for 10 seconds in a Bunsen burner flame at 1000° C., they extinguished themselves within 3–4 seconds after removal from the flame. Bars containing 30% decachloroketone did not ignite under these conditions.

TABLE II

| Decachloroketone Wt., Percent | Flexural Modulus, $10^{-5}$ P.s.i. | Tensile Strength, P.s.i. | | Elongation at Break, Percent | Rockwell Hardness, L | Heat Distortion Temp., ° C. |
|---|---|---|---|---|---|---|
| | | At Yield | At Break | | | |
| 0 | 2.7 | 8,400 | 9,200 | 88 | 91 | 146 |
| 20 | 2.7 | 8,700 | 8,500 | 87 | 89 | 128 |
| 30 | 2.8 | 8,400 | 8,100 | 97 | 91 | 128 |

The invention has been described in considerable detail with particular reference to certain preferred embodiments thereof, but it will be understood that variations and modifications can be effected within the spirit and scope of the invention as described hereinabove, and as defined in the appended claims.

What is claimed is:

1. A composition comprising a polycarbonate having an inherent viscosity of at least 0.4 and decachlorooctahydro-1,3,4-metheno-2H-cyclobuta(cd)pentalen-2-one.

2. A comparison comprising from about 90% to about 60% by weight of a polycarbonate having an inherent viscosity of at least 0.4, the recurring structural unit of said polycarbonate containing the residue of at least one aromatic dihydroxy compound, and from about 10% to about 40% by weight of decachlorooctahydro-1,3,4-metheno-2H-cyclobuta(cd)pentalen-2-one.

3. A composition of claim 2 in which the said aromatic dihydroxy compound is a bisphenol.

4. A composition of claim 2 in which the said aromatic dihydroxy compound is a 4,4′ alkylidenediphenol.

5. A composition of claim 2 in which the said aromatic dihydroxy compound is a hydroquinone.

6. A composition of claim 2 in which the said aromatic dihydroxy compound is a naphthalenediol.

7. A composition comprising from about 80% to about 70% by weight of a polycarbonate having an inherent viscosity of at least 0.4, the recurring structural unit of said polycarbonate containing the residue of at least one aromatic dihydroxy compound, and from about 20% to about 30% by weight of decachlorooctahydro-1,3,4-metheno-2H-cyclobuta(cd)pentalen-2-one.

8. A shaped article of the composition of claim 2.

9. A film of the composition of claim 2.

10. A fiber of the composition of claim 2.

References Cited
UNITED STATES PATENTS 3,146,220  8/1964  Hindersinn et al. ____ 260—77.5
3,205,196  9/1965  Creighton _____ 260—45.7 X DONALD E. CZAJA, Primary Examiner.

L. J. BERCOVITZ, Examiner.

M. J. WELSH, Assistant Examiner.